United States Patent [19]

Sekino

[11] Patent Number: 5,026,090

[45] Date of Patent: Jun. 25, 1991

[54] WHEEL SUSPENSION SYSTEM FOR AUTOMOBILES

[75] Inventor: Yohsuke Sekino, Wako, Japan

[73] Assignee: Honda Giken Kogyo Kabushiki Kaisha, Tokyo, Japan

[21] Appl. No.: 434,752

[22] Filed: Nov. 13, 1989

[30] Foreign Application Priority Data

Nov. 16, 1988 [JP] Japan ............................. 63-289876
Jan. 27, 1989 [JP] Japan ............................... 1-19098

[51] Int. Cl.⁵ ............................................ B60G 3/00
[52] U.S. Cl. ................................. 280/673; 280/675; 280/671; 280/691; 280/716; 267/189; 267/276
[58] Field of Search ............ 280/663, 664, 666, 671, 280/673, 674, 96.1, 690, 691, 695, 696, 716, 717, 721; 267/189, 276, 281

[56] References Cited

U.S. PATENT DOCUMENTS

| Re. 28,259 | 12/1974 | Henschen | 280/716 |
| 2,363,469 | 11/1944 | Goldschmidt | 267/281 |
| 4,132,430 | 1/1979 | Bantle | 280/673 |
| 4,798,396 | 1/1989 | Minakawa | 280/671 |

Primary Examiner—Charles A. Marmor
Assistant Examiner—Tamara L. Finlay
Attorney, Agent, or Firm—Armstrong, Nikaido, Marmelstein, Kubovcik, & Murray

[57] ABSTRACT

In a wheel suspension system for automobiles including an upper and a lower control arm which are carried, at one side of their ends closer to a vehicle body, on the body by a support shaft, the support shaft includes an upper tubular shaft portion having the upper support arm provided on one side thereof so as to project therefrom, a lower tubular shaft portion located below the upper tubular shaft portion and having the lower support arm provided on the one side to project therefrom, and a connecting rod which integrally interconnects the upper and lower support arms. An elastic member is interposed between each of the tubular shaft portions and a core shaft centrally disposed in the tubular shaft portion and secured to the vehicle body. This makes it possible to provide a large torsional rigidity to the support shaft and provide a reduction in weight of the support shaft. Accordingly, it is possible to enhance the rigidity of the wheel suspension system to insure the straight advancing property of the wheel during braking. In addition, the above construction also contributes to a reduction in weight of the system.

7 Claims, 9 Drawing Sheets

WHEEL SUSPENSION SYSTEM FOR AUTOMOBILES

BACKGROUND OF THE INVENTION

Field of the Invention

The field of the present invention is wheel suspension systems for automobiles and particularly, is improvements of wheel suspension systems comprising a pair of upper and lower control arms linked at their leading ends to a knuckle for carrying a wheel, the upper and lower control arms being pivotally connected at one side of their base ends to a vehicle body for vertical swinging movement and being connected at the other side of their base ends to a pair of upper and lower support arms projectingly provided on a support shaft which is supported on the vehicle body through elastic members to extend longitudinally thereof.

Description of the Prior Art

A wheel suspension system similar to the above has already been proposed by the present applicant, as shown in Japanese Patent Application Laid-open No. 106119/88.

In such wheel suspension system, the support shaft is required to have a higher torsional rigidity, because it receives a large torsional load from the upper and lower support arms, particularly during braking. Thereupon, it is thought that the support shaft needs to be formed with a larger diameter to enhance its torsional rigidity. However, the entire support shaft having a larger diameter is not preferred, because it causes an increase in weight.

SUMMARY OF THE INVENTION

The present invention has been accomplished with such circumstances in view, and it is an object of the present invention to provide a wheel suspension system of the type described above, which includes a support shaft having a higher torsional rigidity and a light weight.

To achieve the above object, according to the present invention, there is provided a wheel suspension system for automobiles which comprises a pair of upper and lower control arms being linked at their tip ends to a knuckle for carrying a wheel and being pivotally connected at one side of their base ends to a vehicle body for vertical swinging movement and being connected at the other side of their base ends to a pair of upper and lower support arms projectingly provided on a support shaft which is supported on the vehicle body through elastic members to extend vertically, the support shaft comprising an upper tubular shaft portion having the upper support arm provided on the on side to project therefrom, a lower tubular shaft portion located below the upper tubular shaft portion and having the lower support arm provided on the one side to project therefrom, and a connecting rod which integrally interconnects the upper and lower support arms, with an elastic member interposed between each of the tubular shaft portions and a core shaft centrally disposed in the tubular shaft portion and secured to the vehicle body.

With the above construction, if just opposite rotative moments act on the upper and lower support arms of the support shaft, they are transmitted to and supported by the connecting rod interconnecting the support arms, and this makes it possible to prevent the torsional deformation of the support shaft. In other words, the rigidity of the support shaft is extremely high. Moreover, the support shaft is comprised essentially of the pair of upper and lower tubular shaft portions and hence, the intermediate portion thereof is eliminated. This contributes to a reduction in weight.

In addition to the above construction, a plurality of outer member projections and a plurality of inner member projections can be respectively formed on the tubular shaft portions and the core shafts in a circumferentially opposed relation, and the adjacent inner member projections can be interconnected by a concavely curved surface. An elastic member can be applied to the outer member projection into close contact with the concavely curved surface, so that a clearance is provided in a free state of the elastic member between the elastic member and the inner member projection. The elastic member, when the same direction rotative moments act on the support arms (for example, when the wheel rides up over a protrusion), initially receives a shearing force between the outer member projection of the support shaft and the concavely curved surface of the core shaft and then receives a compressing force between the inner and outer member projections. Therefore, it is possible to increase the repulsive force of the elastic member along a quadratic curve in accordance with the advance of the rotation of the support shaft. When the wheel gets over the protrusion, a moderate longitudinal compliance can be applied to the wheel suspension system to provide an improvement in riding comfort.

Further, in addition to the above construction, the elastic member can be constructed so that a portion deformed by rotation of the support shaft in one direction upon reception of a load by the wheel from the front has a lower spring constant, and a portion deformed by rotation of the support shaft in the other direction upon reception of a load by the wheel from the externally sidewise direction has a higher spring constant. In this manner, the support shaft, when the wheel receives a load from the front during travelling of the vehicle, rotates in one direction to deform the lower spring constant portion of the elastic member. Therefore, the amount of deforming of elastic member is relatively large, whereby the longitudinal compliance of both control arms can be maintained satisfactorily. In contrast, when the outer wheel receives a load from the externally sidewise direction during turning, the support shaft rotates in the other direction to deform the higher spring constant portion of the elastic member. Therefore, the amount of deformation of elastic member is relatively small, whereby the swinging movement of both control arms can be suppressed to a lower level to insure the alignment rigidity of the outer wheel.

The above and other objects, features and advantages of the invention will become apparent from a reading of the following detailed description of the preferred embodiments taken in conjunction with the accompanying drawings.

BRIEF DESCRIPTION OF THE DRAWINGS

FIGS. 1 to 8 illustrate a first embodiment of the present invention, wherein

FIG. 1 is a perspective view of an entire wheel suspension system;

FIG. 2 is a view taken along an arrow labeled II in FIG. 1;

FIGS. 3 and 4 are sectional views taken along lines III—III and IV—IV in FIG. 2, respectively;

FIGS. 5 and 6 are a schematic plan view and a side view for explaining the operation when a wheel goes up a protrusion on a road surface, respectively; and FIGS. 7 and 8 are a schematic plan view and a side view for explaining the operation during braking;

FIGS. 9 to 12 illustrate a second embodiment of the present invention, wherein

FIG. 9 is a view of the second embodiment, similar to FIG. 4, the remaining portions being substantially the same as the first embodiment;

FIG. 10 is a view for explaining a method for forming an elastic member of the second embodiment;

FIG. 11 is a schematic view for explaining the operation during turning of a wheel; and FIG. 12 is a graph of a spring characteristic of the elastic member.

DESCRIPTION OF THE PREFERRED EMBODIMENTS

Figure 1:
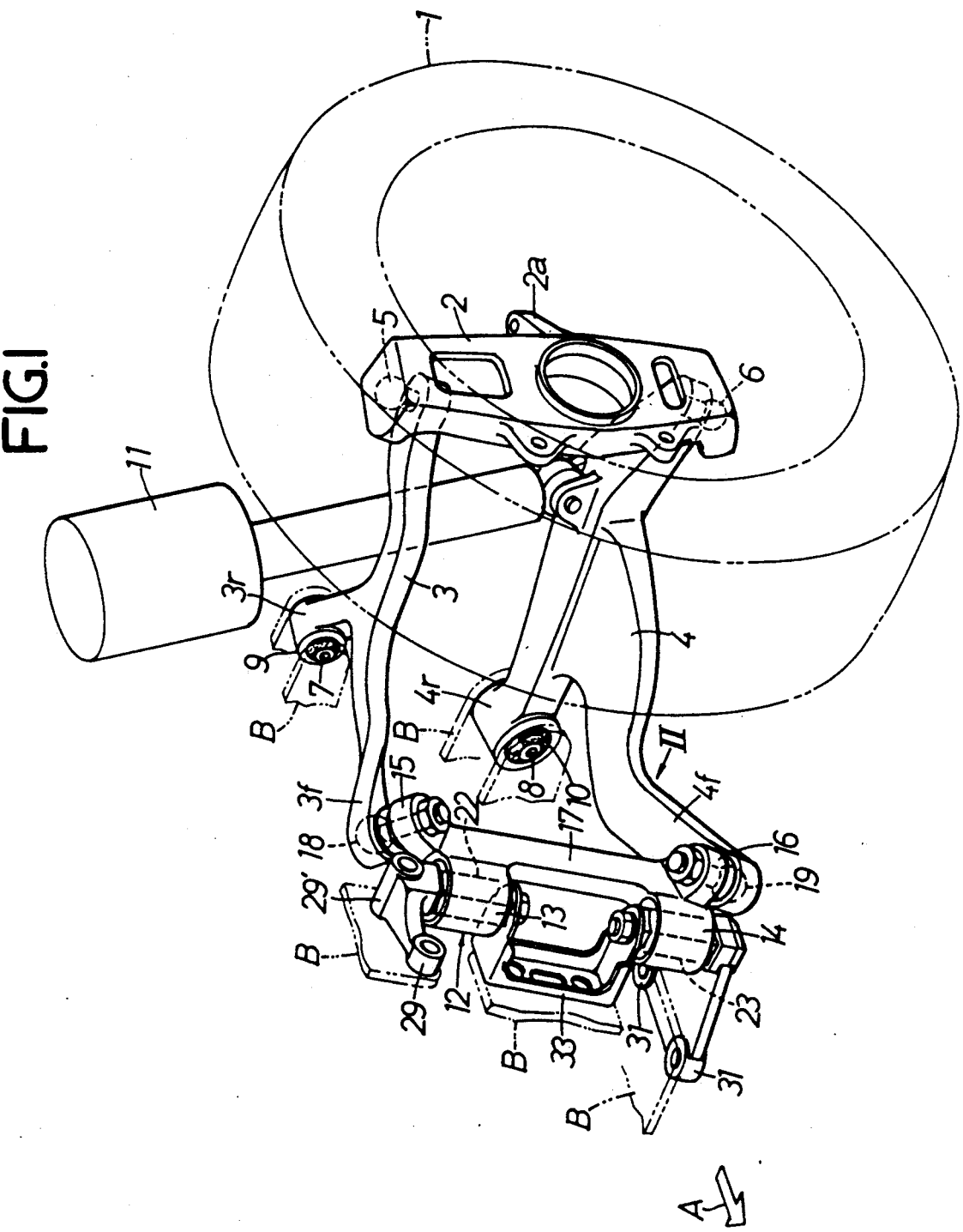

The present invention will now be described by way of a first embodiment with reference to FIGS. 1 to 8. Referring first to FIG. 1, an upper control arm 3 and a lower control arm 4 are connected at their tip ends to upper and lower ends through ball joints 5 and 6, respectively, of a knuckle 2 for carrying a wheel 1. The reference character 2a designates a knuckle arm which may be connected to a steering mechanism in the case of a front wheel suspension system, or fixed to a vehicle body in the case of a rear wheel suspension system.

The upper control arm 3 has a base end bifurcated into a pair of front and rear arm portions 3f and 3r, and the lower control arm 4 has a base end also bifurcated into a pair of front and rear arm portions 4f and 4r. The rear arm portions 3r and 4r are pivotally mounted for vertical swinging movement respectively through elastic members 9 and 10 on pivots 7 and 8 which are secured to the vehicle body B to extend longitudinally of the body B. A damper 11 having a suspension spring is connected to the lower control arm 4 for repulsively urging the latter downwardly.

Figure 2:
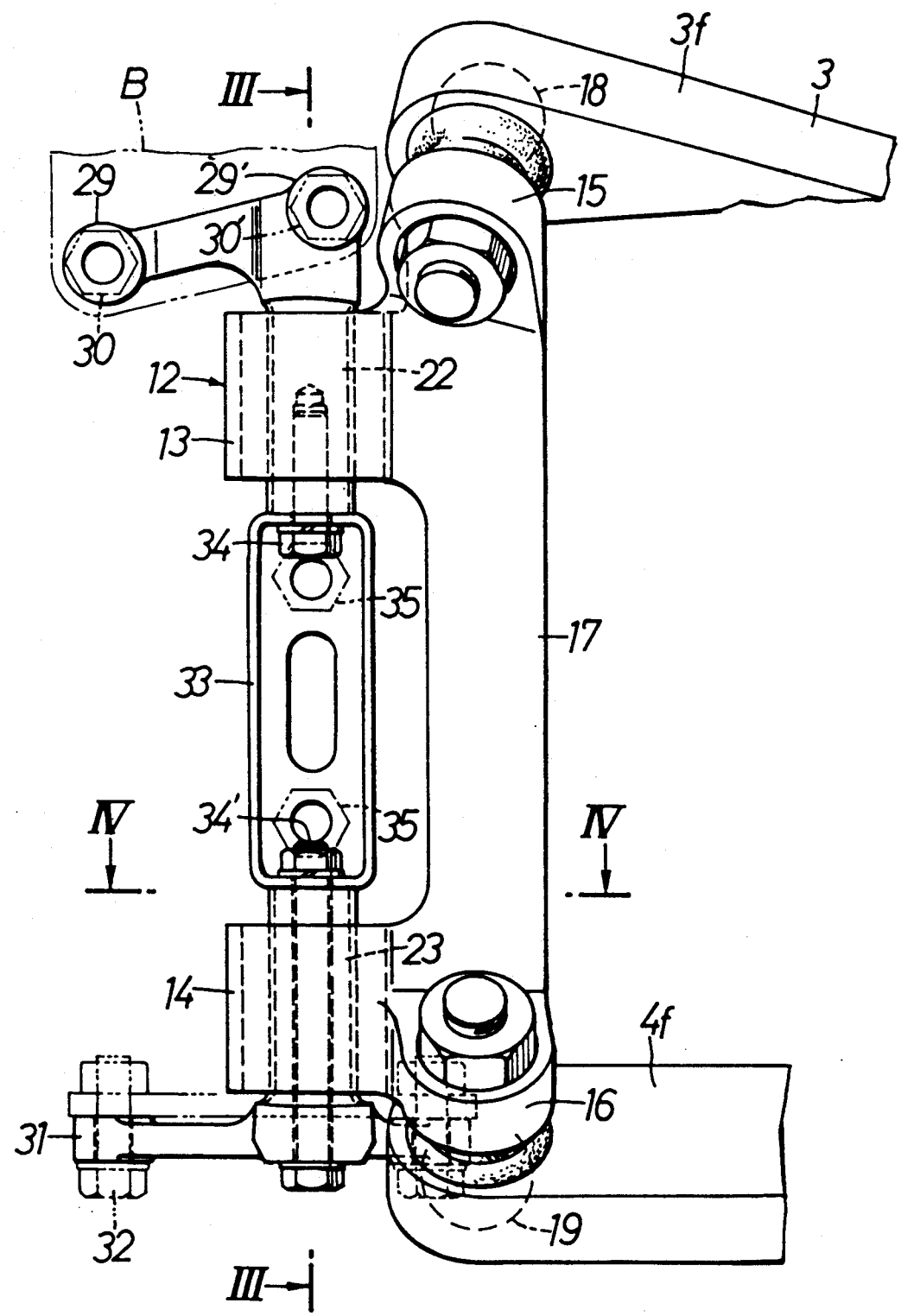
Figure 3:
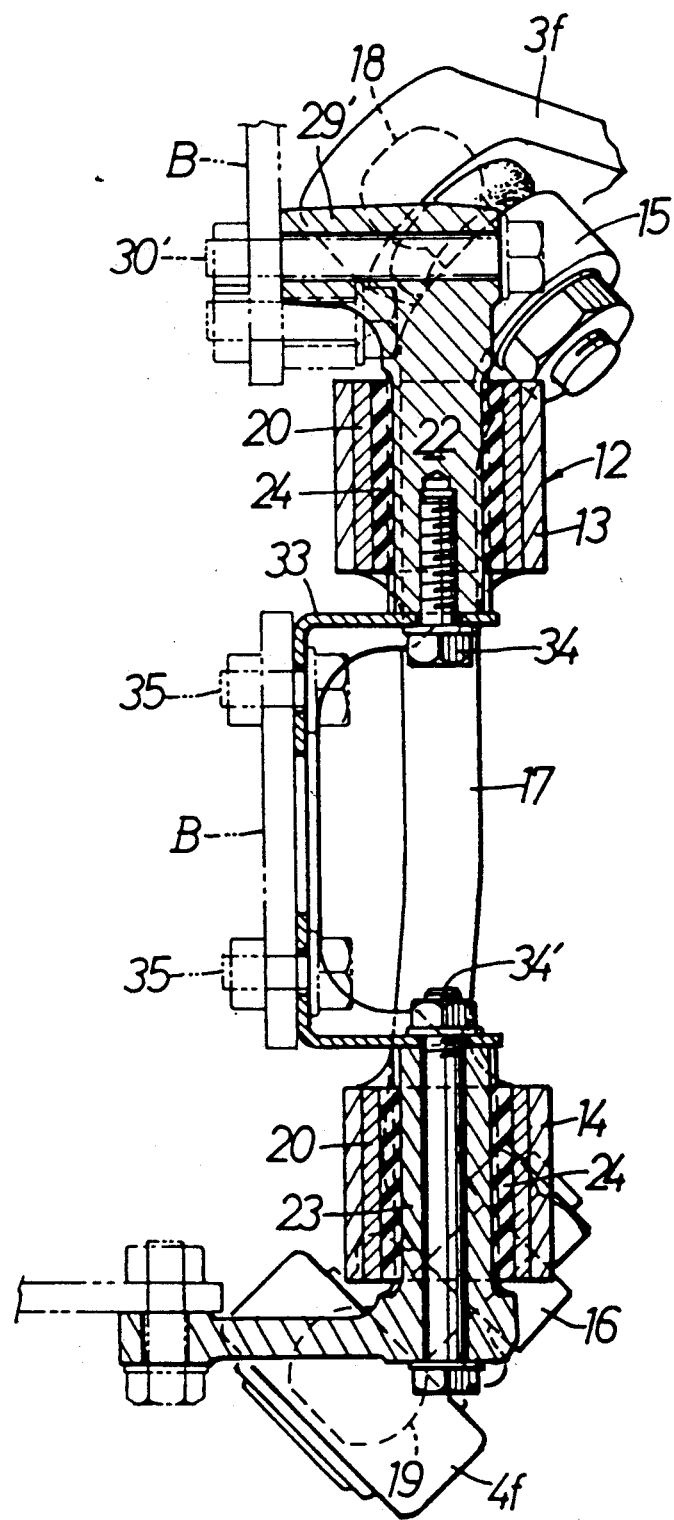

A support shaft 12 is disposed in front of and adjacent the front arm portions 3f and 4f. As shown in FIGS. 1 to 3, the support shaft 12 includes a pair of tubular shaft portions 13 and 14 disposed vertically at a distance spaced apart from each other. The tubular shaft portions 13 and 14 are integrally formed with a pair of upper and lower rearwardly projecting support arms 15 and 16 which are integrally interconnected through a connecting rod 17. The front arm portions 3f and 4f are connected to the support arms 15 and 16 through ball joints 18 and 19, respectively.

Annular members 20, 20 are press-fitted in the tubular shaft portions 13 and 14, respectively, and a plurality of elastic members 24, 24---are interposed between each of the annular members 20 and each of core shafts 22 and 23 centrally disposed therein.

Figure 4:
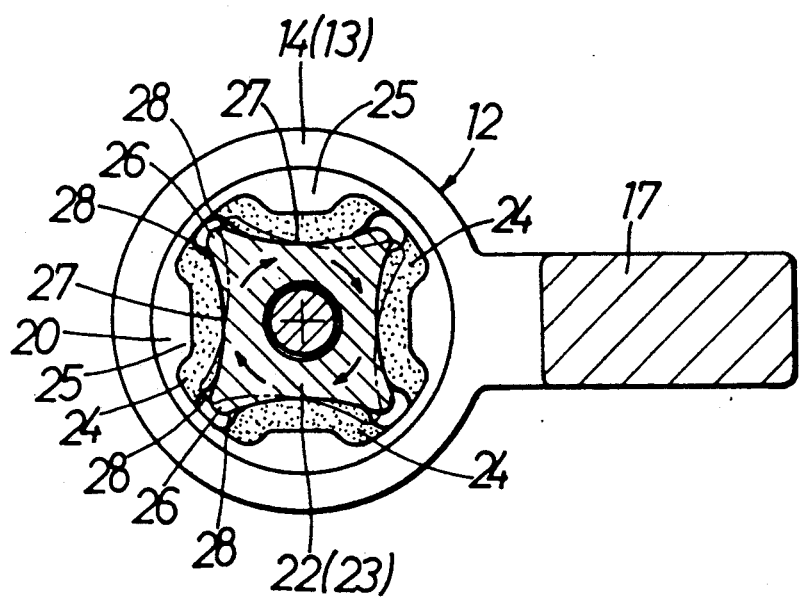

As shown in FIG. 4, a plurality of, e.g., four (in the illustrated embodiment) outer member projections 25, 25---are mounted around an inner peripheral surface of the annular member 20 at circumferentially spaced apart equal distances. The same number of inner projections 26, 26,---as the outer member projections 25 are mounted around an outer peripheral surface of each of the core shafts 22 and 23 in a circumferentially opposed relation to the outer member projections 25, 25--- through the elastic members 24. The adjacent inner member projections 26, 26---are interconnected by a concavely curved surface 27. The elastic member 24 is baked onto a surface of the outer member projection 25, so that it may be brought into close contact with the concavely curved surface 27. In this case, a predetermined clearance 28 may be provided in a free state of the elastic member 24 between the elastic member 24 and the inner member projection 26.

The annular member 20 is made from a material of an aluminum alloy by an extrusion. This makes it possible to easily provide any complicated sectional shape. In this case, if the outer member projection is subjected to a wall cutting, it is possible to provide a reduction in weight of the annular member 20.

The upper core shaft 22 is integrally provided at its upper end with a pair of mounting bosses 29 and 29' which are secured to the vehicle body B by bolts 30 and 30'. The lower core shaft 23 is also integrally provided at its lower end with a pair of mounting bosses 31, 31 which are also secured to the vehicle body B by bolts 32, 32. Further, a connecting member 33 made of a steel plate is interposed between both of the core shafts 22 and 23 and is secured at its opposite ends to the core shafts 22 and 23 by bolts 34 and 34'. The connecting member 33 is also connected to the vehicle body B by bolts 35, 35.

The reference character A denotes a vehicle front.

The operation of the first embodiment will be described below.

Figure 5:
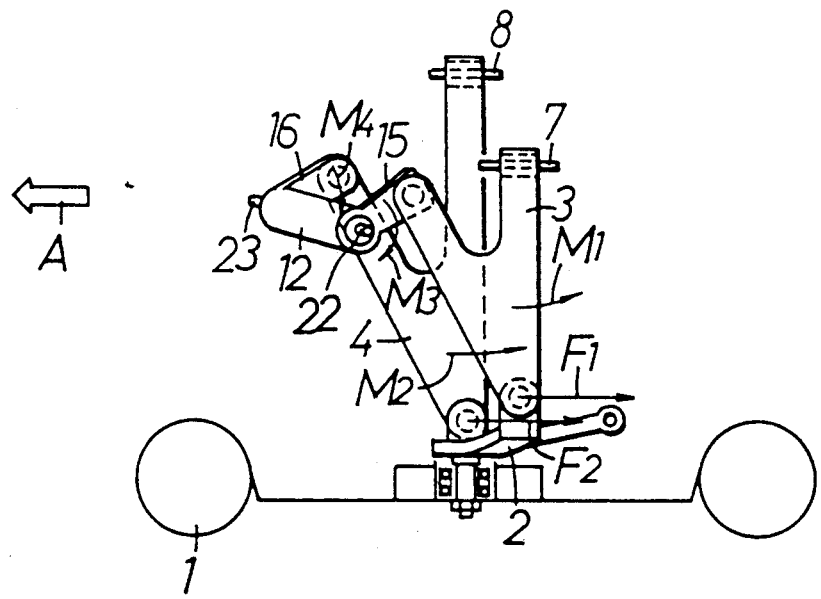
Figure 6:
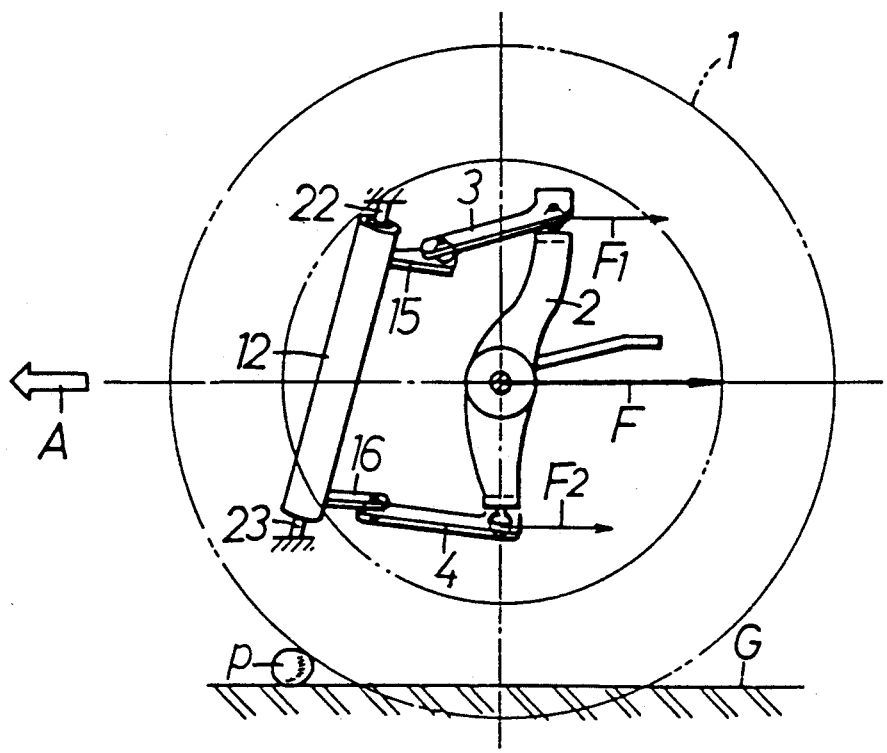

Referring first to FIGS. 5 and 6, suppose that the wheel 1 passes over a protrusion p such as pebbles on a road surface G. When the wheel 1 goes up the protrusion p, a rearward portion of a force applied from the protrusion p to the knuckle 2 is divided into parallel force components F1 and F2 by the knuckle 2 to act on tip ends of the upper and lower control arms 3 and 4, so that the control arms 3 and 4 receive moments M1 and M2 rearward of the vehicle, thereby applying rotative moments M3 and M4 in the same direction to the upper and lower support arms 15 and 16 of the support shaft 12, while deforming the elastic members 9 and 10 at the base ends of the control arms 3 and 4. Therefore, the total moment M3+M4 received by the support shaft 12 is relatively large and thus, the elastic members 24, 24---interposed between the tubular shaft portions 13 and 14 of the support shaft and the core shafts 22 and 23 are relatively easily deformed.

Particularly, each elastic member 24 is easily deformed under reception of only a shearing force between the outer member projection 25 and the concavely curved surface 27 until one clearance 28 between the elastic member 24 and the inner member projection 26 is eliminated. Therefore, a large longitudinal compliance is applied to the wheel suspension system, thereby moderating an impact force from the protrusion p to prevent it from being transmitted to the vehicle body B.

When the shear deformation of each elastic member 24 is proceeded by a predetermined amount to eliminate the clearance 28, that elastic member 24 receives a compressing load between the outer and inner member projections 25 and 26 and thus exhibits a large repulsive force, thereby inhibiting an excessive rotation of the support shaft 12. Particularly, the variation in repulsive force of the elastic member 24 during this time is of a quadratic curve, and it is possible to inhibit the excessive rotation of the support shaft 12 without the impact.

The upward and downward movements of the front wheel 1 attendant on getting over the protrusion p are accepted by the vertical swinging movements of the upper and lower control arms 3 and 4 about the corresponding pivots 7 and 8 and the corresponding ball joints 18 and 19.

Figure 7:
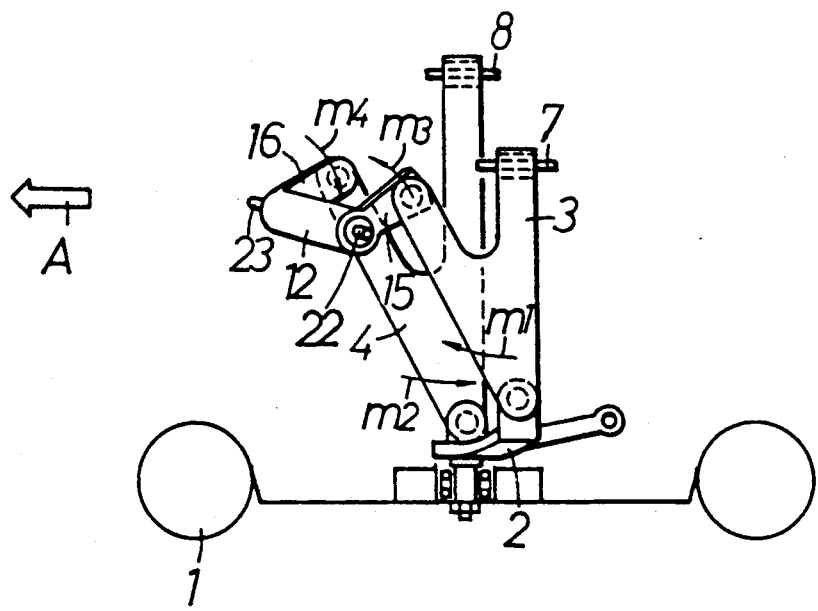
Figure 8:
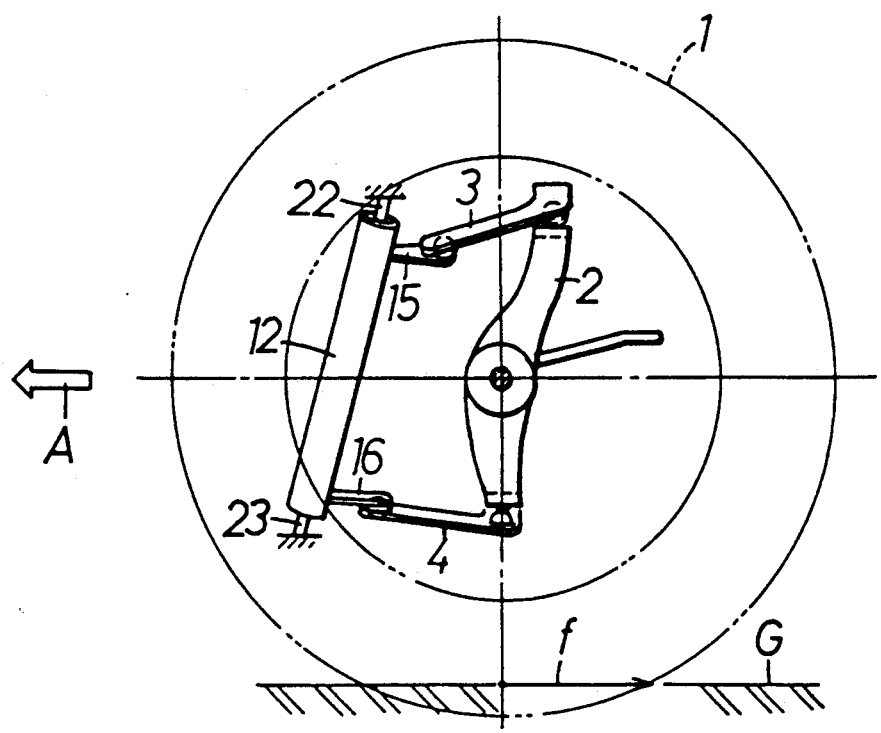

Then, referring to FIGS. 7 and 8, suppose that the wheel has been braked by the operation of a brake device (not shown) during the travelling of the vehicle. When the wheel 1 has been braked, a frictional braking force f acting on the wheel 1 from the road surface G allows a forward moment $m_1$ to be applied to the upper control arm 3 and allows a rearward moment $m_2$ to be applied to the lower control arm 4, so that the upper control arm 3 applies a counter clockwise rotative moment $m_3$ as viewed in FIG. 7 to the upper support arm 15 of the support shaft 12, while the lower control arm 4 applies a clockwise rotative moment $m_4$ to the lower support arm 16 of the support shaft 12. The rotative moments $m_3$ and $m_4$ applied to the support arms 15 and 16 in this way are just opposite in direction and hence, negate each other through the support shaft 12. As a result, the upper and lower control arms 3 and 4 are kept from being moved forwardly or rearwardly to prevent displacement of the knuckle 2 against the frictional braking force f of the road surface G.

Particularly, because the support arms 15 and 16 of the support shaft 12 are connected to the connecting rod 17 at a location far away from the central axis of the support shaft 12, the opposite rotative moments $m_3$ and $m_4$ applied to the support arms 15 and 16 in the above manner are surely supported by the connecting rod 17. The support arms 15 and 16 have a large torsional rigidity, and this ensures that the displacement of the control arms 3 and 4 by the rotative moments $m_3$ and $m_4$ can be inhibited to prevent a variation in caster angle.

Furthermore, the support shaft 12 comprises essentially the pair of upper and lower tubular shaft portions 13 and 14 with useless tubular portions eliminated from the central portion, thereby providing a reduction in weight.

A second embodiment of the present invention will be described below with reference to FIGS. 9 and 12.

The second embodiment is different only in construction of an elastic member 124 from the previous first embodiment, and the other constructions are the same as in the first embodiment. Therefore, only the elastic member 124 will be described below. The same components as in the first embodiment are designated by the same reference characters.

Figure 9:
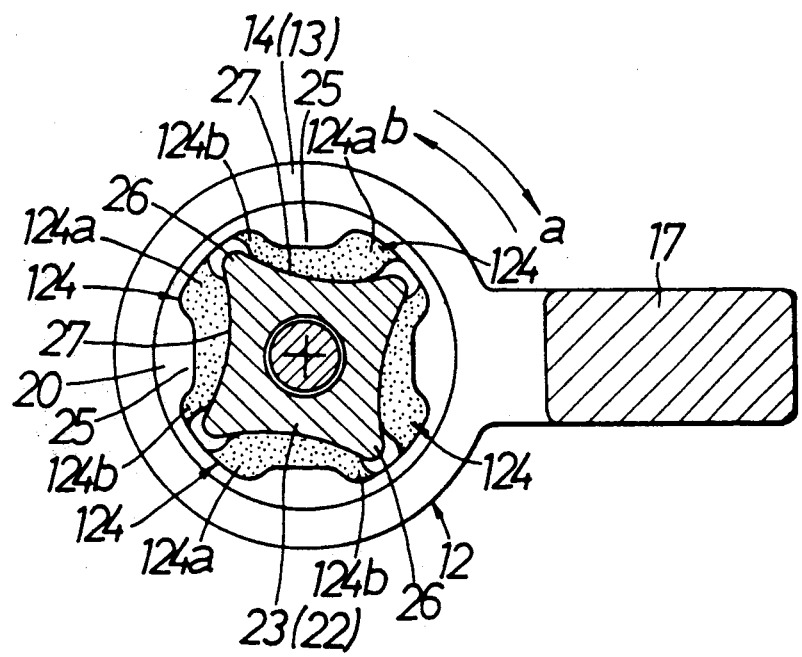

As shown in FIG. 9, each elastic member 124 baked to the outer member projection 25 is formed at one end into a thicker portion 124a having a lower spring constant and at the other end into a thinner portion 124b having a higher spring constant. Thus, when the wheel 1 receives a load from the front, so that the tubular shaft portions 13 and 14 of the support shaft 12 are rotated relative to the core shafts 22 and 23 in a direction of an arrow a, the thicker portion 124a is subjected to a shear and compression deformation between the inner and outer member projections 26 and 25 sandwiching the thicker portion therebetween. When the wheel 1 receives a load from the outside, so that the tubular shaft portions 13 and 14 of the support shaft 12 are rotated relative to the core shafts 22 and 23 in a direction of an arrow b, the thinner portion 124b is subjected to a shear and compression deformation between the inner and outer member projections 26 and 25 sandwiching the thinner portion therebetween.

Figure 10:
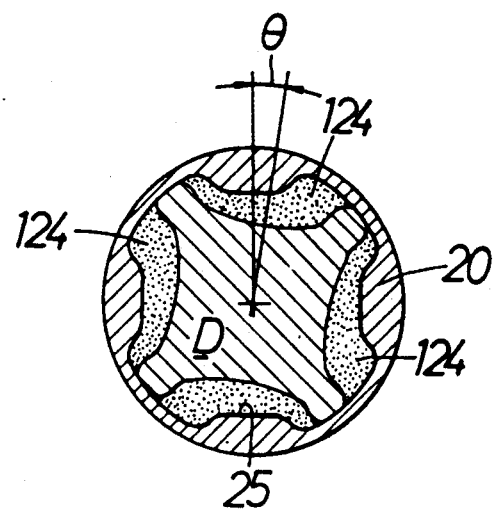

The plurality of elastic members 124 are formed in the following manner. As shown in FIG. 10, a molding core D is inserted into the annular member 20 and set in a state misaligned in phase through a predetermined angle Θ with respect to the annular member 20. A material for the elastic member 124 is filled into the entire clearance between the annular member 20 and the molding core D and baked to only the annular member 20. Thereafter, the molding core D is withdrawn. In this way, the elastic members 124 are formed by a single effort and baked to surfaces of the outer member projections 25 of the annular member 20.

The operation of the second embodiment will be described below.

When the wheel 1 passes a protrusion p such as pebbles on a road surface G during travelling of the vehicle, the elastic members 124, 124—deform relatively easily as in the previous first embodiment. Particularly in this case, the tubular shaft portions 13 and 14 of the support shaft 12 rotate relative to the core shafts 22 and 23 in the direction of the arrow a as shown in FIG. 9, so that the lower spring constant thicker portion 124a of each elastic member 124 is subjected to a shear and compression deformation between the inner and outer member projections 26 and 25, wherein the deformed amount is relatively large as indicated by a line O–A in FIG. 12. The easy deformation of the thicker portion 124a of each elastic member 124 in such a manner ensures that a larger longitudinal compliance is applied to the control arms 3 and 4, thereby moderating the impact force from the protrusion p to prevent it from being transmitted to the vehicle body B.

Figure 11:
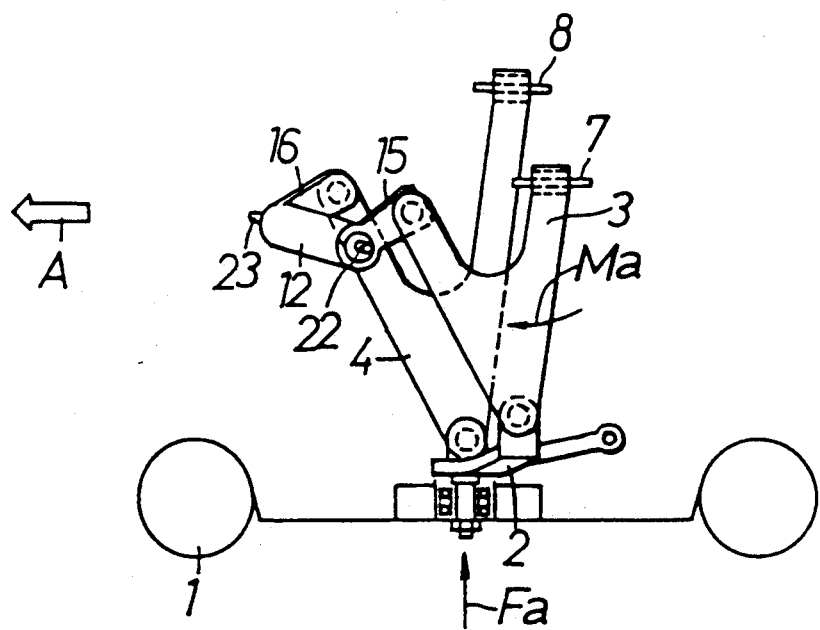

Referring to FIG. 11, during turning of the vehicle, the wheel 1 receives, from the externally sidewise direction, a reaction force Fa of the road surface against the centrifugal force of the vehicle body. Then, the control arms 3 and 4 receive a forward rotative moment Ma, so that the tubular shaft portions 13 and 14 of the support shaft 12 are rotated relative to the core shafts 22 and 23 in the direction of the arrow b. With this rotation, the higher spring constant thinner portion 124b of each elastic member 124 is subjected to a shear and compression deformation between the inner and outer member projections 26 and 25, wherein the deformed amount is relatively small as indicated by a line O–B in FIG. 12. In this manner, the amount of swinging movement of the control arms 3 and 4 under the action of the aforesaid load Fa can be suppressed to a lower level, thereby insuring the alignment rigidity of the wheel 1.

Figure 12:
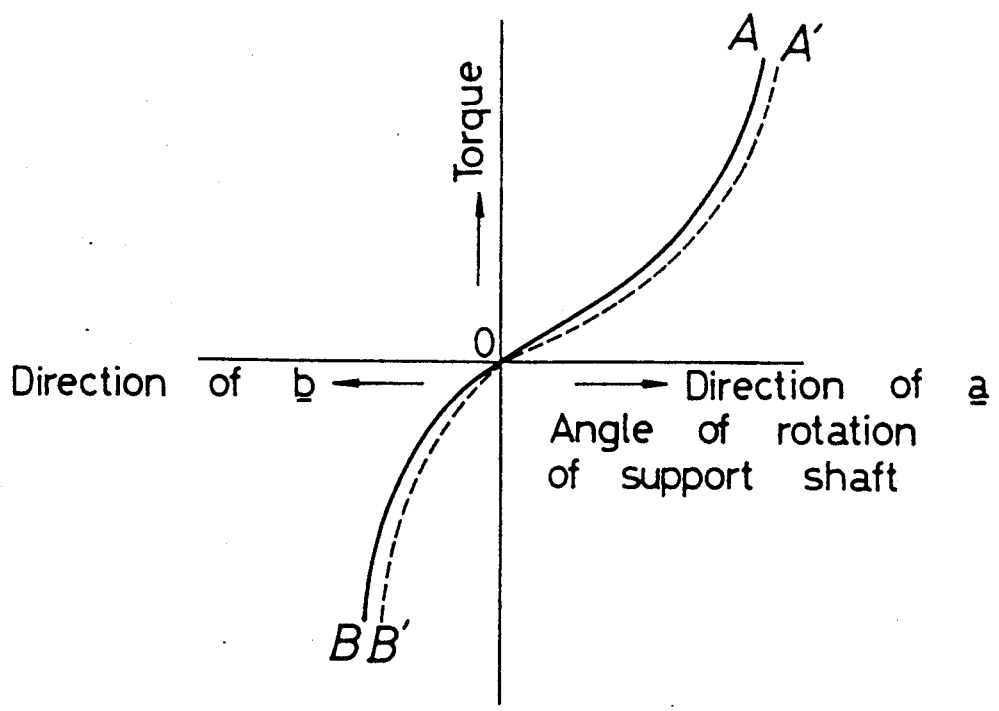

In this case, only by increasing or decreasing the misalignment Θ in phase of the molding core D (shown in FIG. 10) during formation of the elastic member 124, the spring characteristics thereof can be freely changed to produce desired results in use, for example, as indicated by A'–O–B' in FIG. 12.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A wheel suspension system for automobiles, comprising a pair of upper and lower control arms, each having a tip end and a base end, said upper and lower control arms being linked at their tip ends to a knuckle for carrying a wheel and being pivotally connected at one side of their base ends to a vehicle body for vertical swinging movement and being connected at the other side of their base ends to a pair of upper and lower support arms projectingly provided on a support shaft which is supported on the vehicle body through elastic members to extend vertically thereof, said support shaft comprising an upper tubular shaft portion having the upper support arm provided on one side thereof so as to project therefrom, a lower tubular shaft portion located below the upper tubular shaft portion and having the lower support arm provided on one side thereof so as to project therefrom, and a connecting rod which integrally interconnects said upper and lower support arms and vertically extends at a location eccentric from central axes of the upper and lower tubular shaft portions, an elastic member being interposed between each of the tubular shaft portions and a core shaft centrally disposed in the tubular shaft portion and secured to the vehicle body.

2. A wheel suspension system for automobiles according to claim 1, further including a plurality of outer member projections and a plurality of inner member projections respectively formed in said tubular shaft portions and said core shafts in a circumferentially opposed relation, the adjacent inner member projections being interconnected by a concavely curved surface, wherein said elastic member is applied to each outer member projection and is in close contact with said concavely curved surface, with a clearance being provided in a free state of said elastic member between said elastic member and the adjacent inner member projection.

3. A wheel suspension system for automobiles according to claim 1, wherein said elastic member is constructed so that a portion thereof deformed by rotation of said support shaft in one direction upon reception of a load by the wheel from a front side of the vehicle body has a lower spring constant, and a portion of the elastic member deformed by rotation of said support shaft in the other direction upon reception of a load by the wheel from an externally sidewise direction has a higher spring constant.

4. A wheel suspension system for automobiles according to claim 3, wherein the lower spring constant portion of said elastic member is formed having a thickness larger than that of the higher spring constant portion.

5. A wheel suspension system for automobiles according to claim 1, 2, 3 or 4, wherein said elastic member is baked onto an inner peripheral surface of the tubular shaft portion.

6. A wheel suspension system for automobiles according to claim 1, further including a member connecting said core shafts for the upper and lower tubular shaft portions with each other, said connecting member being secured to said vehicle body.

7. A wheel suspension system according to claim 6, wherein said connecting member is disposed in a space provided between said upper and lower tubular shaft portions.

* * * * *